United States Patent [19]

Wright et al.

[11] Patent Number: 4,983,106
[45] Date of Patent: Jan. 8, 1991

[54] ROTARY SCREW MACHINE WITH MULTIPLE CHAMBERS IN CASING FOR LUBRICATION-CODING FLUID

[75] Inventors: Dan Wright; Allan Riach, both of Glasgow, United Kingdom; Jean-Marie Crinquette, Annecy le Vieux, France; René Sibuet; Jacques Long, both of Annecy, France

[73] Assignee: Societe Anonyme dite: Alcatel Cit, Paris, France

[21] Appl. No.: 417,115

[22] Filed: Oct. 4, 1989

[30] Foreign Application Priority Data

Oct. 7, 1988 [FR] France ............................ 88 13193

[51] Int. Cl.$^5$ .................... F04C 29/02; F04C 29/04
[52] U.S. Cl. ............................. 418/2; 418/84; 418/85; 418/87; 418/94
[58] Field of Search ................ 418/2, 83, 84, 85, 94, 418/88, 87

[56] References Cited

U.S. PATENT DOCUMENTS

| | | | |
|---|---|---|---|
| 2,938,664 | 5/1960 | Nöller | 418/85 |
| 3,833,318 | 9/1974 | Nakayama et al. | 418/100 |
| 3,913,346 | 10/1975 | Moody, Jr. et al. | 62/197 |
| 3,961,862 | 6/1976 | Edstrom et al. | 418/87 |
| 4,125,210 | 2/1988 | Suzuki et al. | 418/88 |
| 4,228,657 | 10/1980 | Leo | 418/83 |
| 4,420,291 | 12/1983 | Winstead | 418/83 |

FOREIGN PATENT DOCUMENTS

| | | | |
|---|---|---|---|
| 115492 | 7/1984 | Japan | 418/84 |
| 41986 | 2/1987 | Japan | 418/201 R |
| 785860 | 11/1957 | United Kingdom | |

Primary Examiner—John J. Vrablik
Assistant Examiner—David L. Cavanaugh
Attorney, Agent, or Firm—Sughrue, Mion, Zinn, Macpeak & Seas

[57] ABSTRACT

The machine comprises first and second screw rotors (1, 2) supported by bearings (47) in a stator casing (3) which is provided with a suction inlet and a delivery outlet, the first rotor is driven by a motor (10) and the second rotor is driven by means of synchronizing gearing (11-12) situated in a first chamber (14) of the casing and located between the motor (10) and one of the ends of the rotors, the gearing (11-12) running in a lubricating fluid (15), the machine is characterized in that the cavity (30) of the casing containing the rotors (1-2) is separated from the first chamber (14) by a first wall (16) having the shafts (8, 13) of the rotors passing therethrough via seals (17-18), in that the shafts of the rotors at the opposite ends of the rotors to the ends having the gearing pass through a second wall (20) via seals (24-25), and in that the casing (3) includes, beyond the second wall (20), a second chamber (31) connected to the first chamber (14) by a main pipe (29) provided with pumping means (49), the rotors and the stator-casing including fluid circulation channels (32 to 34) terminating firstly in the second chamber (31) and secondly in the first chamber (14) and/or in that portion of the pipe (29) lying between the first chamber (14) and the pumping means, with a heat exchanger (41) being disposed on the path of the pipe (29).

3 Claims, 2 Drawing Sheets

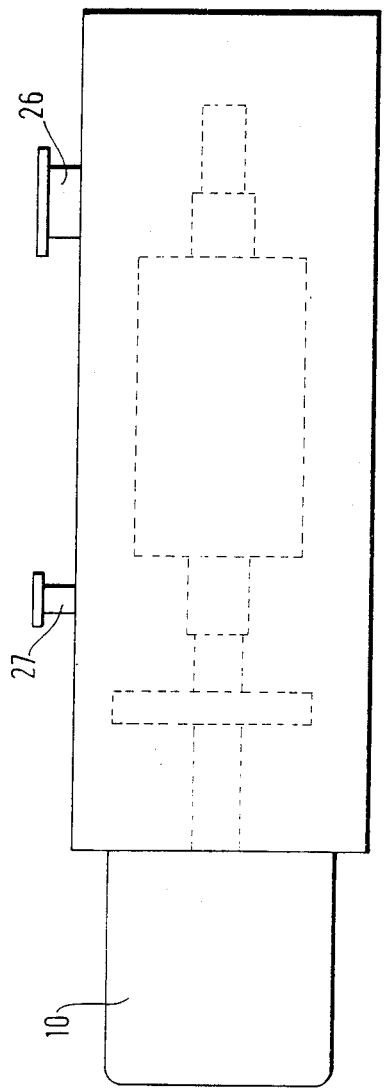

ROTARY SCREW MACHINE WITH MULTIPLE CHAMBERS IN CASING FOR LUBRICATION-CODING FLUID

The present invention relates to a rotary machine of the screw pump type.

BACKGROUND OF THE INVENTION

These machines are driven by a motor and they have a high flow rate, greater than 50 m$^3$/h, and they rotate at speeds higher than 10,000 revolutions per minute (rpm). At atmospheric pressure they are capable of maintaining suction down to a pressure of 10$^{-2}$ mbar. At a suction pressure in the range 200 mbar to 300 mbar, they absorb large amounts of power which is dissipated entirely as heat. Since the rotor and the stator are very different in thermal mass and in thermal dissipation, it is necessary to place considerable clearance between the rotors and the stator in order to avoid seizing. This gives rise to a poor quality flowrate/pressure characteristic.

An object of the present invention is to improve the flow rate-pressure characteristic by taking measures that make it possible to reduce the clearance between the rotors and the stator.

SUMMARY OF THE INVENTION

The present invention provides a rotary machine of the screw pump type, the machine comprising a first rotor and a second rotor having conjugate screws and supported by bearings inside a stator casing enclosing the rotors and provided with a suction inlet communicating with the cavity in which the rotors are situated at one end of the rotors, and a delivery outlet communicating with said cavity at the other end of the rotors, the first rotor being rotated by a drive motor and the second rotor being rotated via synchronizing gearing situated in a first chamber of said casing and lying between said motor and one of the ends of said rotors, said synchronizing gearing running in a lubricating fluid, wherein the cavity of the casing containing said rotors is separated from said first chamber containing said gearing by a first wall through which the shafts of said rotors pass via seals, wherein the shafts of the rotors at the opposite end of the rotors to the end having said gearing pass through a second wall via seals, and wherein said casing comprises, beyond said second wall, a second chamber connected to said first chamber by a main pipe provided with pumping means, the rotors and the stator-casing including fluid circulation channels terminating firstly in said second chamber and secondly in said first chamber and/or in that portion of said pipe which is situated between said first chamber and said pumping means, with a heat exchanger being disposed on the path of said pipe in order to cool said lubricating fluid.

In a preferred embodiment of the invention, said stator casing includes a third chamber situated between said second wall and a third wall closing off one of the ends of the rotors and having the rotor shafts passing therethrough via seals, rotor supporting bearings being disposed in one or other of the second and third walls between the seals therein, an auxiliary pipe connecting said first chamber to said third chamber, said fluid circulation channels in the rotors having both orifices that open out into said third chamber and orifices that terminate between the support bearings of the rotors which are mounted in said first wall and said seals via which the rotor shafts pass through said first wall.

According to another feature, two temperature probes are installed inside the stator casing, one of them being disposed as close as possible to the rotors and the two probes being connected to a control box which generates a control signal used for controlling an adjustable valve situated in said pipe provided with pumping means.

Thus, by means of the dispositions of the invention, the rotary machine is cooled and the temperatures of the stator-casing and of the rotors are equalized, thereby making it possible to use small clearances which are favorable to obtaining a good pressure/flowrate characteristic.

BRIEF DESCRIPTION OF THE DRAWINGS

An embodiment of the invention is described by way of example with reference to the accompanying drawings, in which:

FIG. 2 is an outside elevation view.

DETAILED DESCRIPTION

Figure 1:
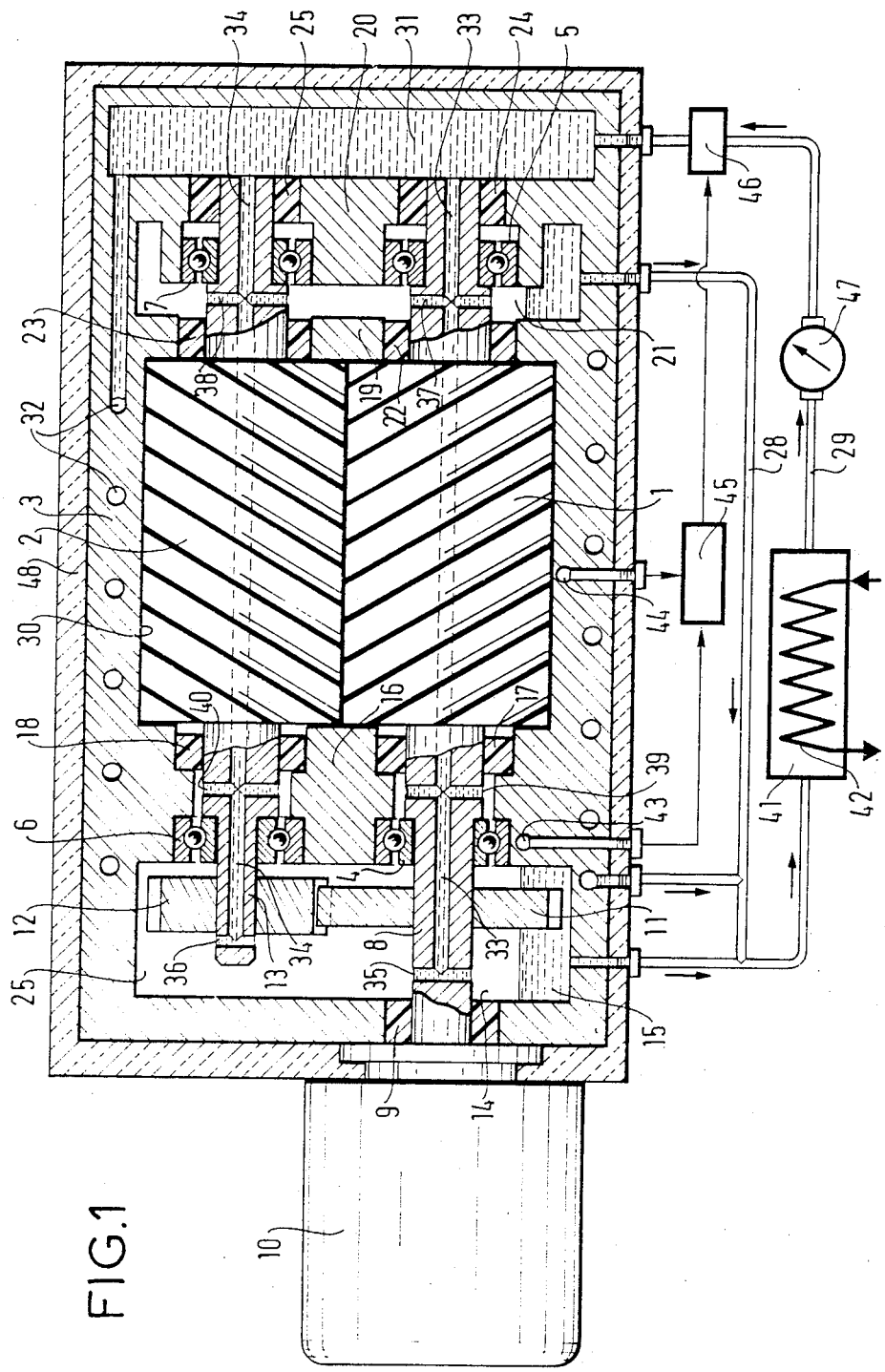
FIG. 1 is a diagrammatic axial section through a dry vacuum screw pump in accordance with the invention.

With reference to the accompanying figures, the rotary machine shown, which in the present case is a dry vacuum screw pump, comprises first and second conjugate screw rotors 1 and 2. These two rotors are mounted inside a stator casing 3 which contains them and inside which they are carried by ball bearings 4 and 5 for the first rotor 1, and 6 and 7 for the second rotor 2.

The shaft of the first rotor 1 passes through the end of the stator casing 3 via a seal 9 and is rotated by a drive motor 10. The second rotor 2 is rotated by means of synchronizing gearing comprising a gear wheel 11 mounted on the shaft 8 and a gear wheel 12 mounted on the shaft 13 of the second rotor 2.

The synchronizing gearing 11-12 is situated inside the casing 3 in a first chamber 14 containing a lubricating liquid 15. This first chamber 14 is separated from the portion of the cavity 30 in the casing which contains the two rotors 1 and 2 by means of a first wall 16 which carries the ball bearings 4 and 6. Seals 17 and 18 are disposed in said first wall 16 where the shafts 8 and 13 pass through it. At the other end, the rotor shafts 8 and 13 pass successively through a third wall 19 and a second wall 20 with a third chamber 21 being delimited therebetween. A second chamber 31 is delimited between the second wall 20 and the end of the stator casing. The third wall 19 closes the ends of the rotors 1 and 2, and the shafts 8 and 13 pass through it via seals 22 and 23. Similarly, the second wall 20 has the shafts 8 and 13 passing through it via seals 24 and 25. The ball bearings 5 and 7 are mounted in the second wall 20 between the seals 22 and 24 on shaft 8 and between the seals 23 and 25 on shaft 13. Similarly, at the opposite end, the ball bearings 4 and 6 are mounted in the first wall between the seals 17 and 18 and the first chamber 14.

The stator casing 3 has a suction inlet 26 which communicates with the internal cavity 30 of the stator casing via the third wall 19, and a delivery outlet 27 which communicates with the internal cavity 30 of the stator housing 3 through the first wall 16. The third chamber 21 communicates with the first chamber 14 via an auxiliary pipe 28 for lubricating and cooling fluid 15 which is situated in both of these chambers, which is sucked by a circulation pump 47 situated in a main pipe 29, and which is delivered to the second chamber 31, and from there to circulation channels 32 in the stator, and 33 and 34 in the rotors. The circulation channel 32 in the stator terminates at the other end of the machine in the first chamber 14, or else, as shown in the drawing, directly in the suction end of the auxiliary pipe 28 or the main pipe 29. The circulation channels 33 and 34 in the rotors have evacuation orifices 35 and 36 opening out directly into the first chamber 14, orifices 37 and 38 leading to the third chamber 21 and projecting lubricating liquid onto the ball bearings 5 and 7, and finally orifices 39 and 40 situated between the seals 17 or 18 and the bearings 4 or 6 for lubricating the bearings 4 and 6. The main pipe 29 includes a heat exchanger 41 which is cooled by a water circuit.

Two temperature probes 43 and 44 are installed inside the stator casing 3, with the probe 44 being disposed as close as possible to the rotors 1 and 2 so as to measure the temperatures of the stator and the rotors. The probes are connected to a control box 45 which generates a signal for controlling the flow rate of the cooling and lubricating fluid 15 as a function of the temperature difference measured by the probes 43 and 44, with this signal operating a flow rate adjusting valve 46 situated in the main pipe 29.

In order to obtain a more uniform temperature distribution in the vacuum pump, the entire stator-casing assembly 3 is enclosed in thermally insulating material 48. The insulating material 48 has the additional advantage of providing sound insulation.

We claim:

1. A dry vacuum screw pump rotary machine comprising: a stator casing, a cavity within said casing, a drive motor, a first rotor and a second rotor having conjugate screws and supported by bearings inside said stator casing cavity and enclosing the rotors, a suction inlet communicating with the cavity at one end of the rotors, a delivery outlet communicating with said cavity at the other end of the rotors, the first rotor being connected to said drive motor for rotating said first rotor, synchronizing gearing situated in a first chamber of said casing and lying between said motor and one of the ends of said rotors and coupled to said first and second rotors, said synchronizing gearing running in a lubricating fluid, the cavity of the casing containing said rotors being separated from said first chamber containing said gearing by a first wall, said rotors having rotor shafts, the shafts of said rotors passing via seals through said first wall, the shafts of the rotors at the opposite end of the rotors to the end having said gearing passing through a second wall via seals, and wherein said casing comprises, beyond said second wall, a second chamber, a main pipe connecting said second chamber to said first chamber, pumping means within said main pipe, the rotors and the stator-casing including fluid circulation channels extending from said second chamber to said fist chamber, said pipe having a heat exchanger disposed in the path of said pipe to cool said lubricating fluid circulated by said pumping means whereby said stator and said rotors may be maintained at near equal temperature with reduced clearance between the rotors and the stator.

2. A rotary machine according to claim 1, wherein said stator casing includes a third chamber situated between said second wall and a third wall closing off one of the ends of the rotor, said rotor shafts passing through said third wall via seals, rotor supporting bearings being disposed in the second wall between the seals within said second and third walls, an auxiliary pipe connecting said first chamber to said third chamber, and said fluid circulation channels in the rotors having orifices opening out into said third chamber and orifices terminating between the support bearings of the rotors which are mounted in said first wall and said seals within said first wall via which the rotor shafts pass through said first wall.

3. A rotary machine according to claim 1, wherein two temperature probes are installed inside the stator casing, one of said probes being disposed as close as possible to the rotors for sensing rotor temperature, and the other being disposed remote from the rotors and said two probes being connected to a control box and generating a control signal used for controlling an adjustable valve situated in said pipe provided with said pumping means to maintain said stator casing and said rotors at nearly the same temperature.

* * * * *